United States Patent
Rasheed et al.

(10) Patent No.: US 7,841,167 B2
(45) Date of Patent: Nov. 30, 2010

(54) PULSE DETONATION ENGINE BYPASS AND COOLING FLOW WITH DOWNSTREAM MIXING VOLUME

(75) Inventors: Adam Rasheed, Glenville, NY (US); Anthony John Dean, Scotia, NY (US); Peirre Francois Pinard, Delmar, NY (US); Christian Lee Vandervort, Voorheesville, NY (US); Venkat Eswarlu Tangirala, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 928 days.

(21) Appl. No.: 11/561,155

(22) Filed: Nov. 17, 2006

(65) Prior Publication Data
US 2008/0115480 A1    May 22, 2008

(51) Int. Cl.
F02K 5/02 (2006.01)
(52) U.S. Cl. ...................... 60/248; 60/39.76
(58) Field of Classification Search ............... 60/39.38, 60/39.39, 39.4, 39.76, 39.77, 39.78, 39.79, 60/247, 248, 249
See application file for complete search history.

(56) References Cited

U.S. PATENT DOCUMENTS

| | | | | |
|---|---|---|---|---|
| 2,609,660 A * | 9/1952 | Tenney et al. | ............... | 60/787 |
| 2,612,748 A * | 10/1952 | Tenney | ............... | 60/266 |
| 6,374,615 B1 * | 4/2002 | Zupanc et al. | ............... | 60/748 |
| 6,439,503 B1 * | 8/2002 | Winfree et al. | ............... | 244/53 R |
| 6,442,930 B1 * | 9/2002 | Johnson et al. | ............... | 60/226.1 |
| 7,055,308 B2 * | 6/2006 | Pinard et al. | ............... | 60/247 |
| 2004/0237504 A1 * | 12/2004 | Pinard et al. | ............... | 60/247 |
| 2006/0260291 A1 * | 11/2006 | Vandervort et al. | ............... | 60/39.76 |
| 2008/0029756 A1 * | 2/2008 | Hudait et al. | ............... | 257/14 |

OTHER PUBLICATIONS

Fuhua Ma et al.; "Thrust Chamber Dynamics and Propulsive Performance of Multitude Pulse Detonation Engines"; Journal of Propulsion and Power; vol. 21, No. 4, Jul.-Aug. 2005; pp. 681-691.

Houshang B. Ebrahimi et al.; "Simulation of 2-D and 3-D Multitude Pulse Detonation Engines with Conical Nozzle and Different Splitter Plates"; American Institute of Aeronautics and Astronautics; pp. 1-12.

* cited by examiner

*Primary Examiner*—Michael Cuff
*Assistant Examiner*—Young Choi
(74) *Attorney, Agent, or Firm*—Penny A. Clarke

(57) ABSTRACT

An engine contains at least one pulse detonation combustor which is surrounded by a bypass flow air duct, through which bypass air flow is directed. The bypass air duct contains at least one converging-diverging structure to dampen or choke the upstream propagation of shock waves from the pulse detonation combustor through the bypass flow air duct. The bypass air also serves to cool the outer surfaces of the pulse detonation combustor. The bypass air flow is controlled in tandem with the heat release from the PDC to provide the appropriate amount of thermal energy to a downstream energy conversion device, such as a turbine. A mixing plenum is positioned downstream of the pulse detonation combustor and bypass flow air duct.

27 Claims, 4 Drawing Sheets

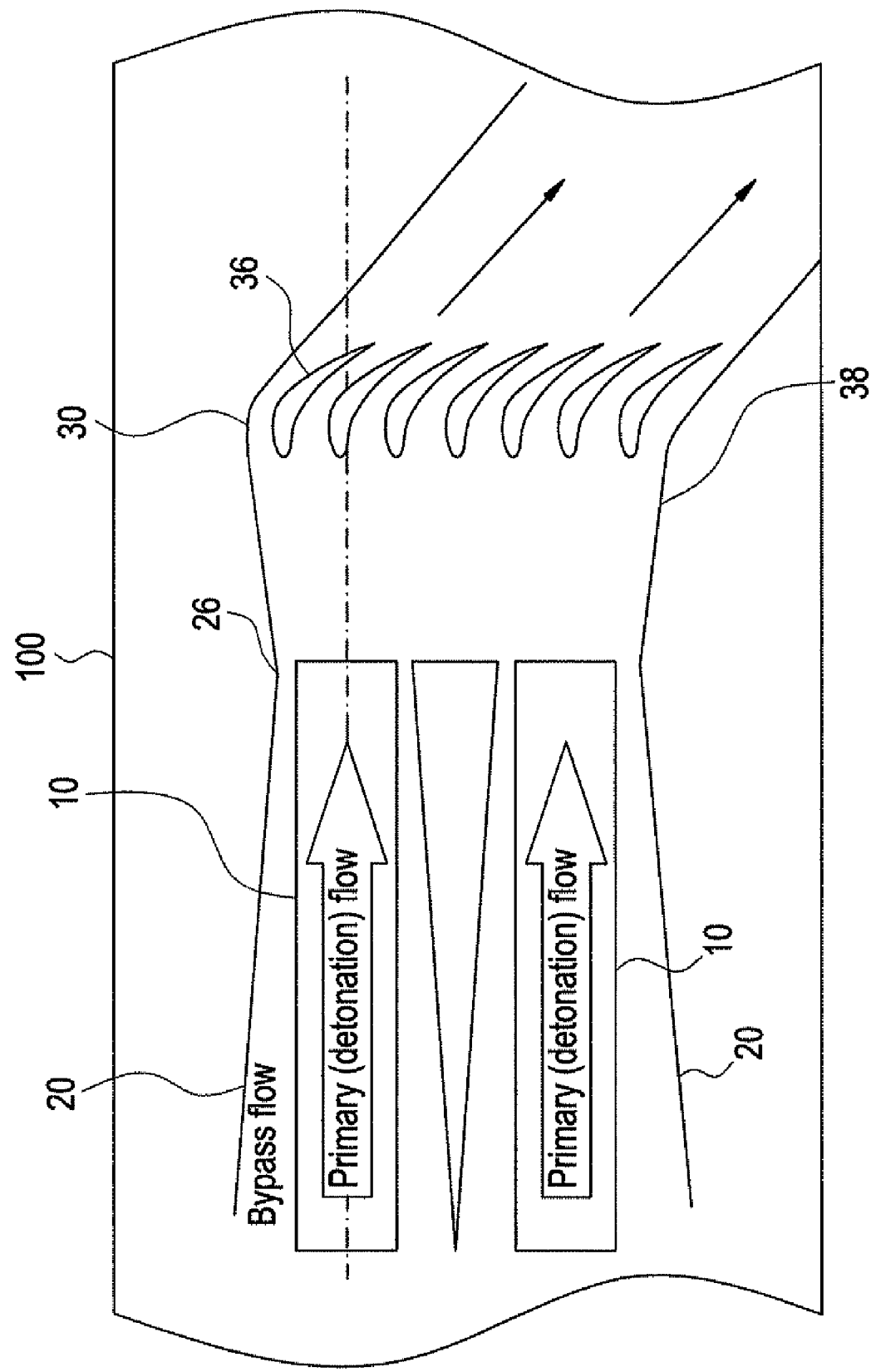

PULSE DETONATION ENGINE BYPASS AND COOLING FLOW WITH DOWNSTREAM MIXING VOLUME

BACKGROUND OF THE INVENTION

This invention relates to pulse detonation systems, and more particularly, to a pulse detonation engine bypass and cooling flow, with downstream mixing volume.

With the recent development of pulse detonation combustors (PDCs) and engines (PDEs), various efforts have been underway to use PDC/Es in practical applications, such as combustors for aircraft engines and/or as means to generate additional thrust/propulsion in a post-turbine stage. Further, there are efforts to employ PDC/E devices into "hybrid" type engines which use a combination of both conventional gas turbine engine technology and PDC/E technology in an effort to maximize operational efficiency. It is for either of these applications that the following discussion will be directed. It is noted that the following discussion will be directed to "pulse detonation combustors" (i.e. PDCs). However, the use of this term is intended to include pulse detonation engines, and the like.

One problem, which often arises when employing PDCs in a "hybrid" engine configuration, is the presence of losses due to unsteady pressure waves that are generated by the pulse detonation process. These waves can propagate "upstream" into some of the conventional engine components, for example bypass flow. Stated differently, in some applications the pressure waves at the exit of the PDC nozzle are so great that they travel upstream into bypass or normal compressor flow. This often causes flow reversals within these conventional components which can damage these components and/or adversely affect the overall operation of the engine.

An additional problem associated with the use of PDCs is the large amount of heat generated during operation, which can significantly shorten the operational life of the PDC and related components.

It is also necessary to achieve a desired average exit temperature from the PDC while facilitating stable operation within the detonation chamber. In parallel, it is beneficial to minimize the temperature variation at the exit of the PDC so that the downstream components can achieve maximum thermodynamic efficiency with robust life.

Therefore, there exists a need to prevent the shock losses generated by the detonation and a means to provide sufficient cooling for a PDC during operation, and a means to achieve the desired exit temperature and uniform profile, in a hybrid engine configuration.

SUMMARY OF THE INVENTION

In an embodiment of the present invention, an engine contains at least one pulse detonation combustion device which is surrounded, at least in part by a bypass duct which has a converging-diverging portion which directs bypass flow to mix with the exit flow from the PDC. In another embodiment of the present invention, the bypass duct contains either a converging portion or a diverging portion, or both.

By directing bypass flow to mix with the exhaust of the PDC, the desired exhaust conditions from the PDC can be obtained, and the use of the converging-diverging/converging/diverging portion in the duct aids in preventing back flow (and the associated shock losses) of the pulse detonation exhaust into the bypass duct. Additionally, the use of the bypass duct allows the bypass air to aid in cooling the PDC during operation.

In an embodiment of the invention, at least a portion of the outer surface of the PDC, which is within the bypass duct, has a plurality of turbulators, surface concavities, and/or protrusions which act as heat exchangers for the PDC, allowing the bypass air flow to aid in cooling the PDC.

A further embodiment of the present invention includes a mixing chamber, including a plenum, located at the exit of the PDC and bypass flow nozzle. This chamber enhances mixing of the PDC exhaust and bypass air. This enhanced mixing assists the PDC exhaust and bypass air in reaching a steady state temperature. The enhancement of mixing of the PDC exhaust and bypass flow, provides optimum conditions for a downstream device such as a turbine or ejector. Thus, the bypass air assists in diluting the output of the PDC for optimal downstream operation.

It is known that detonability limits for fuel in air are often relatively narrow. At least for that reason, a PDC typically operates in a small range of fuel-air ratios. Thus, the resulting temperatures of the combustion products (which are very high for pulse detonation combustions), are often higher than those permitted in downstream devices, such as turbines, because of physical and operational limits. Introduction of bypass air into the products of detonation can reduce the average temperature. Efficient mixing of the bypass air and products of detonation results in uniform exit temperature. Therefore, it is needed to optimize mixing of the bypass flow and PDC exhaust prior to entering any downstream device.

The present invention also contains an embodiment where a plurality of PDCs are surrounded at least in part with a bypass duct according with the present invention.

As used herein, a "pulse detonation combustor" PDC (also including PDEs) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

As used herein, "engine" means any device used to generate thrust and/or power.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 4 shows a diagrammatical representation of another embodiment of the present invention having a mixing plenum.

DETAILED DESCRIPTION OF THE INVENTION

The present invention will be explained in further detail by making reference to the accompanying drawings, which do not limit the scope of the invention in any way.

Figure 1:
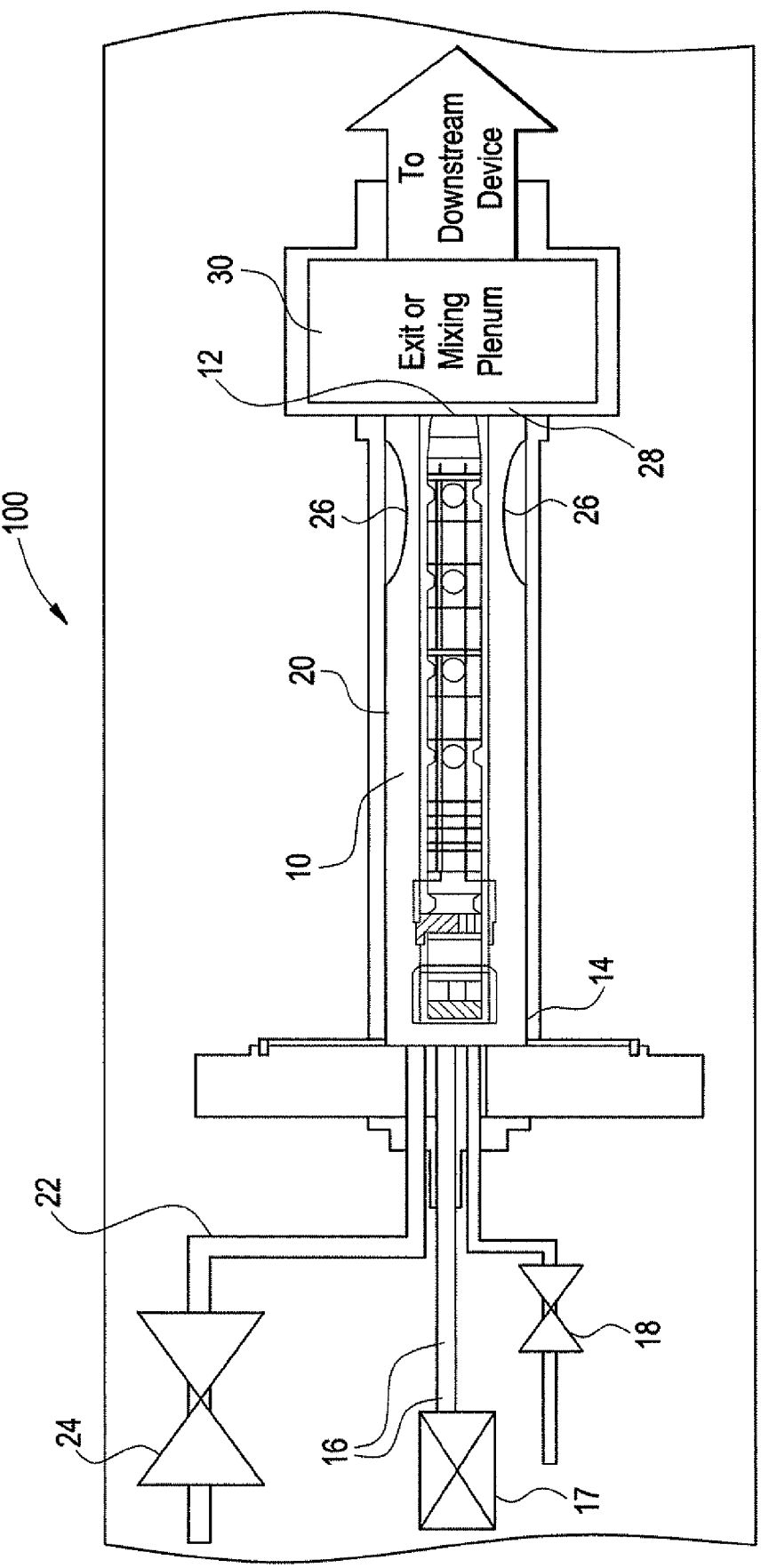
FIG. 1 shows a diagrammatical representation of a pulse detonation engine having a hybrid bypass and cooling duct in accordance with an embodiment of the present invention.

FIG. 1 depicts an engine 100 having at least one pulse detonation combustor 10 having an exit nozzle 12 and an input portion 14. Air flow for the combustor 10 is provided from a primary air flow source 16, which can be from a compressor stage (not shown) of the engine 100, or comparable source. The primary air flow may also be controlled by a primary air control valve 17. Fuel is supplied to the combustor 10 via a high frequency fuel control valve 18.

The fuel control valve 18 may be controlled by any known or conventional means. In the present invention, it is contemplated that the valve 18 be controlled so as to modulate or regulate heat release from the working fuel. Namely, the fuel, and detonation, control is such that the generation of heat by the combustor 10 can be set to the appropriate level for efficient energy conversion by some downstream device.

For the purposes of the present invention, the operation and function of the pulse detonation combustor 10 is in accordance with any known or conventional means and methods. The present invention is not limited, in any way, to the operation and configuration of the pulse detonation combustor. The flow of the primary air into the combustor 10 may be controlled by the valve 17 to provide the proper stoichiometric conditions for sustainable detonations. The flow control may be achieved by any known or convention means.

At least partially surrounding the combustor 10 is a bypass flow duct 20 through which a bypass air flow is passed. In the embodiment shown, the bypass flow duct 20 completely surrounds the combustor 10 in an annulus type configuration. However, the present invention is not limited in this regard, as the shape of the duct 20 may be different, and it may only partially surround the combustor 10. In an embodiment of the present invention, the interior surface of the duct 20 is the exterior surface of the combustor 10. Because of this, the heat exchange from the combustor 10 to the bypass air flow can be optimized.

Air flow enters the bypass duct 20 via a secondary air flow system 22 which may or may not have an air control valve 24. If present, the valve 24 controls the air flow into the duct 20 to optimize operation of the device as a whole. For example, it is contemplated that during certain aspects of operation it may be necessary to maximize air flow through the primary source 16 into the combustor 10. Then during other operational parameters the valve 24 is opened to allow secondary air flow to enter the duct 20. Additionally, the valve 24 may be controlled to provide proper dilution at the exit of the bypass duct 20, so that the desired exit temperatures of the combustor stage, as a whole, are achieved.

In a further embodiment of the invention, it is contemplated that the flow is controlled by the valve 24 such that the flow pressure peaks at a time corresponding to when a pressure/shock wave exits the exit nozzle 12 of the combustor 10, so as to provide optimal mixing and pressure blocking.

In an embodiment of the invention, the secondary air flow is provided by the same source that provides the air flow for the combustor 10. Which can be a compressor stage of an engine. However, it is also contemplated that the secondary air flow can be provided from a separate and discrete source, such as exterior air flow from around the engine (in aircraft applications). The present invention is not limited in this regard.

Within the duct 20 is a converging-diverging structure 26 which effectively decreases the flow area of the duct at some point near the exit 28 of the duct 20, which is adjacent to the exit nozzle 12 of the combustor 10. The converging-diverging structure 26 is configured so as to dampen or reduce the strength of detonation shock waves that exit the exit nozzle 12 of the combustor. As these high pressure shock waves exit the nozzle 12, they have a tendency to propagate upstream, which can fatigue and cause damage to upstream components, as well as adversely affect operation. Thus, the presence of the converging-diverging structure 26 reduces this shock strength, and can provide a shock "choke".

The overall shape and size of the converging-diverging structure 26 is to be optimized based on the geometry of the exit nozzle 12 and the duct 20, so as to optimize performance of the bypass air flow through the bypass duct 20 and as a shock wave damper or choke, in the upstream direction. In an embodiment of the invention, the shape and structure is chosen to pump the bypass flow. This aids in enhancing mixing and preventing upstream shock propagation.

The bypass dud 20 has an exit portion 28 which is adjacent to the exit nozzle of the combustor 10. This allows the bypass flow from the duct 20 to mix with the detonative exhaust of the combustor 10. The exit portion 28 is configured so as to maximize mixing and the bypass flow with the combustor flow. This aids in establishing the desired exhaust conditions from the combustor 10. For example, in an embodiment of the present invention, it is contemplated that the exit portion 28 have flow vanes (not shown) which impart turbulence and or swirl into the bypass air flow to enhance mixing with the combustor 10 exhaust. A benefit is to achieve a nearly uniform temperature profile that facilitates optimum energy conversion and robust design life of the downstream device.

In an embodiment of the present invention, it is contemplated that the shape of the converging-diverging structure 26 be variable, such that the flow area at the structure 26 can be changed. This variable geometry configuration allows for optimization of the bypass air flow and flow choking capabilities. The geometry is to be changed based on the desired operational conditions and parameters.

It is also contemplated that the structure 26 be simply a converging structure or a diverging structure. In a converging structure, the exit portion 28 of the duct 20 will have a flow area which is less than that of the upstream portions of the duct 20, so as to act as a flow choke or damper, for the shock waves. Additionally, a diverging structure may be used to provide the necessary shock wave dampening. In an additional embodiment, sections of constant flow area are blended with divergent and/or convergent passages.

In FIG. 1, the converging-diverging structure 26 is a continuous structure, continuous along the outer perimeter of the duct 20. However, it is also contemplated that the structure 26 not be continuous but discrete individual structures. Moreover, the present invention also contemplates having more than one converging-diverging structure 26 along the length of the duct 20. As shown in FIG. 1, only one structure 26 is shown adjacent the exit portion 28 of the duct 20. In an embodiment of the invention, an additional structure 26 may be positioned upstream to provide additional shock wave choke/dampening. This additional structure 26 may have the same, or different, geometry. It is also noted that the shape of this structure need not be circumferentially uniform. In an embodiment of the invention, a non-uniform shape may provide sufficient shock wave suppression while minimizing the overall pressure loss in the system.

Additionally, the present invention is not limited to having the converging-diverging structure 26 extend from the outer wall of the duct 20, but may also extend from the outer surface of the combustor 10.

Downstream of the exit nozzle 12 and exit portion 28 is a mixing plenum 30, which further mixes the bypass air flow and combustor 10 exhaust. As discussed above, the temperature and pressure of the exhaust from a pulse detonation combustor can be extremely high and, in fact, too high for efficient or proper operation of many typical downstream devices, such as turbines. The mixing plenum 30 is used to eliminate or minimize the presence of both "cold" and "hot" streaks or flows with highly peaked temperature profiles, and prevent these from entering any downstream devices. "Cold" streaks are detrimental to optimum energy conversion efficiency of the downstream device. "Hot" streaks reduce the operating life of the device, and/or require the utilization of materials that can withstand higher temperatures. The use of these materials typically require higher costs. Further, the plenum 30 aids in providing a more uniform, steady and/or controllable flow from a pulse detonation combustor 10.

The present invention is not limited to the internal structure or mixing structure of the plenum 30. But the structure and shape are to be optimized so as to provide maximum thermal mixing of the bypass flow the combustor 10 exhaust, while at the same time maintaining the desired operational pressures and speeds. In an embodiment of the invention, the plenum 30 is a diverging plenum, where the effective area of the plenum 30 increases as the flow travels downstream. Such a configuration enhances mixing while also aiding in preventing pressure shocks from the combustor 10 from traveling upstream through the bypass duct 20.

Figure 2:
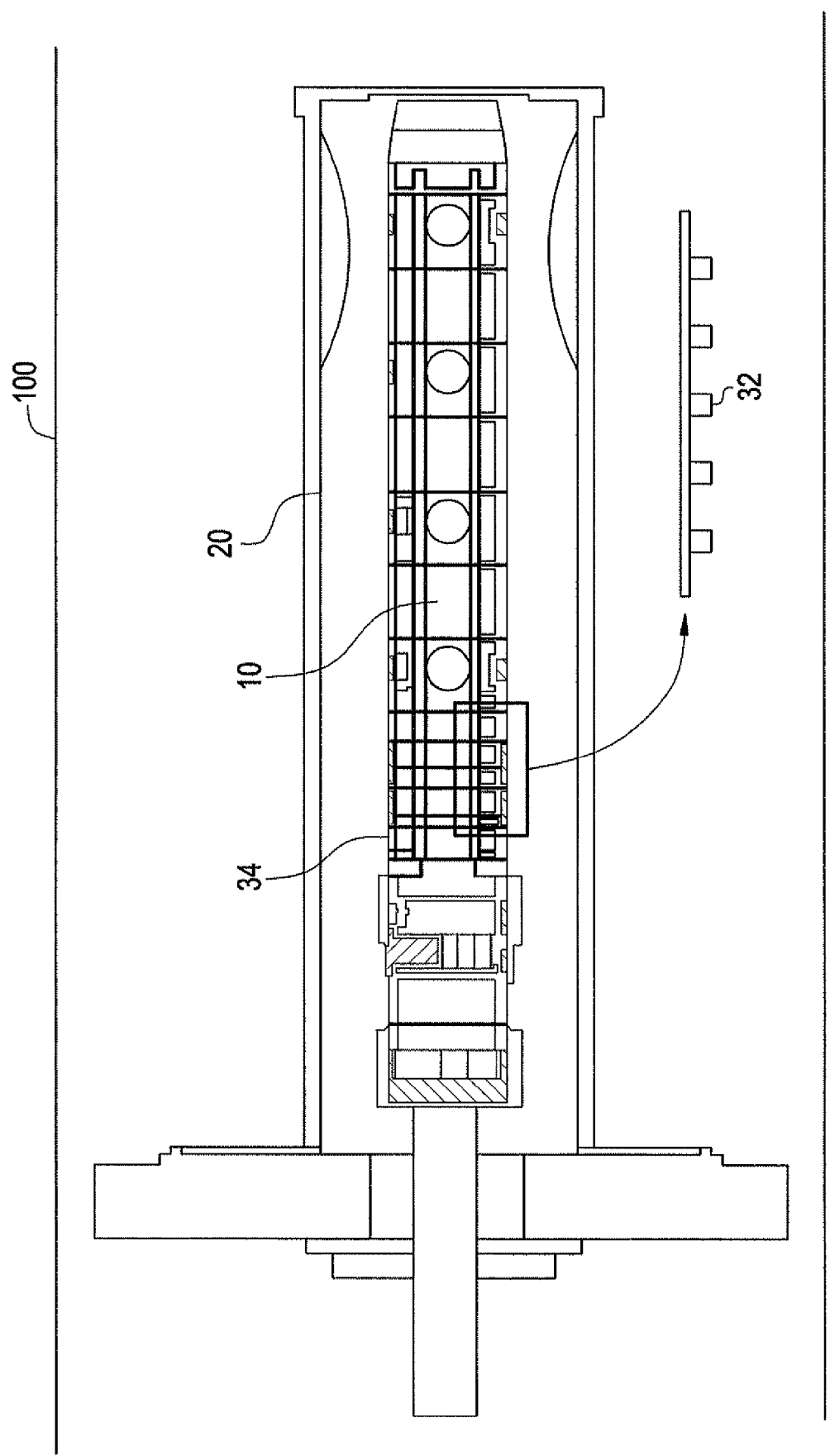
FIG. 2 shows another diagrammatical representation of a hybrid bypass and cooling duct in accordance with an embodiment of the present invention.

FIG. 2 shows another view of the engine 100 in accordance with the present invention. In this figure, the outer surface 34 of the combustor 10 has a plurality of "turbulators", surface concavities and/or protrusions 32 (shown in the exploded view). In this embodiment of the invention, the protrusions 32 are used to increase the overall heat transfer area of the surface of the combustor 10. This increases the overall cooling efficiency of the bypass flow to cool the combustor 10.

It is well known that the detonations which occur in a pulse detonation combustor/engine exist at near stoichiometric conditions, which result in very high gas temperatures. The effect of these high temperatures, the resulting shock waves and high velocity flows, is the transfer of significant energy (primarily in the form of heat) to the walls of the combustor 10.

In the present invention, the use of the bypass air flow serves to effectively cool the combustor 10. With the use of protrusions 32, this cooling is enhanced even more as the surface area is increased. The shape, configuration and number of the protrusions 32 are to be optimized based on the operational parameters and requirements of the various components. In an embodiment of the invention, the shape of the protrusions can be made such that they impart additional turbulence or swirl in the bypass air flow to enhance mixing in the plenum 30.

In a further embodiment, the protrusions 32 may have additional channels, dimples or holes through which the bypass air will flow, to further enhance the heat transfer.

Figure 3:
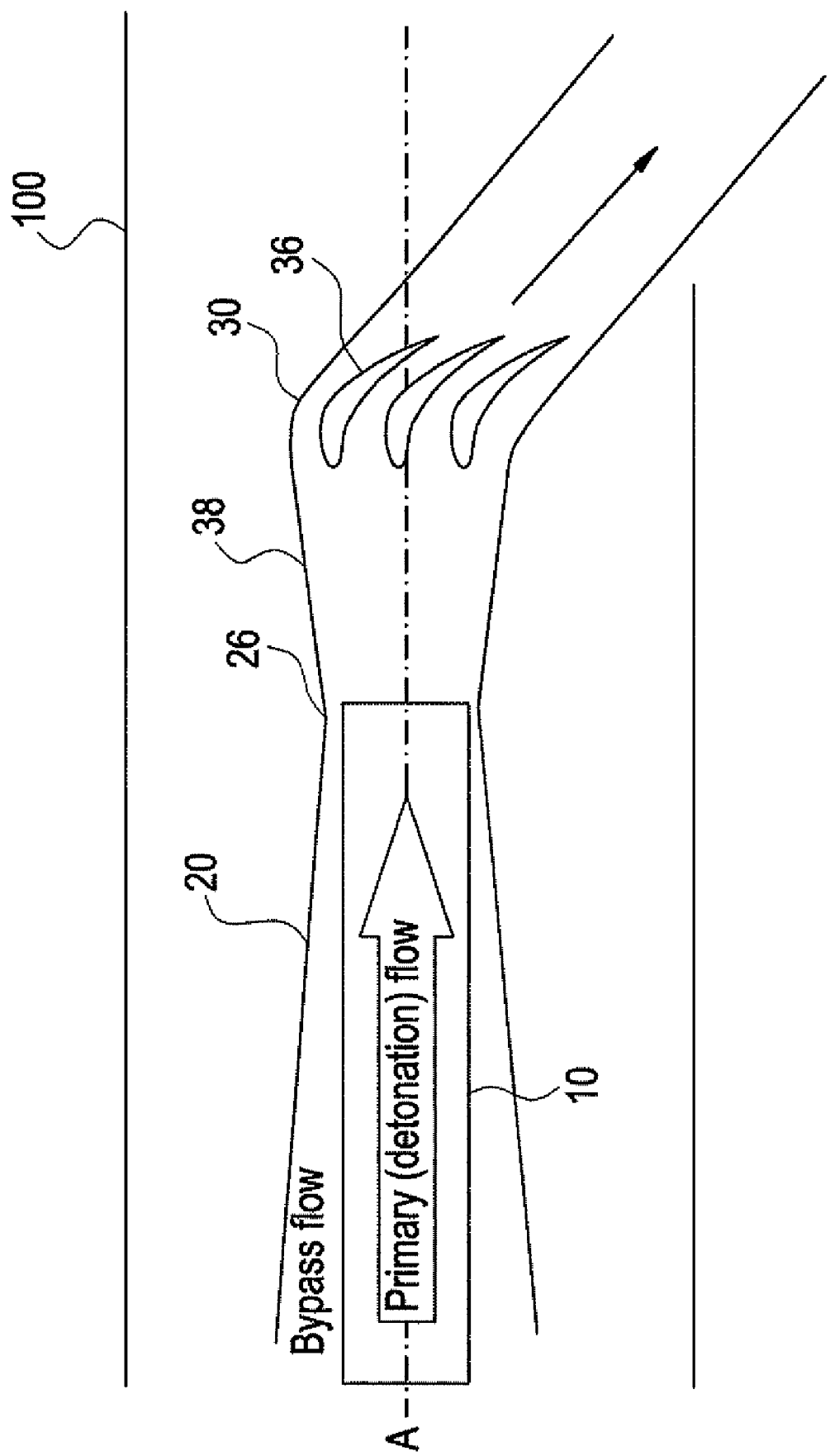
FIG. 3 shows a diagrammatical representation of an embodiment of the present invention having a mixing plenum in accordance with the present invention.

FIG. 3 depicts an embodiment of the present invention where an exemplary embodiment of the internal structure of the mixing plenum 30 is shown.

As shown, in this embodiment, the mixing plenum 30 contains a plurality of airfoil structures 36. The airfoil structures 36 are used to enhance mixing of the bypass duct 20 and combustor 10 exhausts, as well as aid in providing steady organized flow to any downstream devices. The present invention is not limited to the use of these airfoil shapes, but any configuration/shape may be used which achieves the desired effects.

In an exemplary embodiment of the present invention, the airfoils 36 are movable/pivotable so as to direct the flow from the plenum 30 as desired. This may be desirable depending in the configuration/operation of any downstream devices.

As shown in this figure, the outer walls 38 of the plenum 30 are diverging downstream of the exits of the duct 20 and combustor 10. Such a configuration aids in mixing and preventing upstream shock propagation. However, the present invention is not limited to this configuration.

FIG. 4 shows an alternative embodiment of the present invention, which is very similar to the embodiment shown in FIG. 3 except that there are a plurality of combustors 10. The present invention is not limited to the number of combustors 10 and/or bypass ducts 20 which may be employed. The overall operation of this embodiment is similar to that shown above.

In the embodiment shown in FIG. 4, each of the respective combustors 10 are contained within their own respective bypass duct 20. In an alternative embodiment, a single duct structure may be employed within which all of the combustors 10 are placed.

It is noted that although the present invention has been discussed above specifically with respect to aircraft applications, the present invention is not limited to this and can be in any similar detonation/deflagration device in which the benefits of the present invention are desirable.

While the invention has been described in terms of various specific embodiments, those skilled in the art will recognize that the invention can be practiced with modification within the spirit and scope of the claims.

What is claimed is:

1. An engine comprising:
   at least one pulse detonation combustor having an exit nozzle in which a combustion exhaust passes therethrough;
   a bypass duct which surrounds at least a portion of said pulse detonation combustor such that an outer surface of said pulse detonation combustor forms an inner surface of said bypass duct, said bypass duct having an exit portion in which a bypass air flow passes therethrough,
   the exit portion of said bypass duct and the exit nozzle of said at least one pulse detonation combustor proximate each other to cause mixing of the bypass air flow and the combustion exhaust; and
   a bypass control valve in fluid communication with the bypass duct, the bypass control valve allowing air flow to enter into the bypass duct when the bypass control valve is in an open position, and preventing air flow from entering into the bypass duct when the bypass control valve is in a closed position.

2. The engine of claim 1, wherein said bypass duct comprises at least one of a converging-diverging portion, a converging portion, and a diverging portion.

3. The engine of claim 2, wherein said at least one of said converging-diverging portion, said converging portion and said diverging portion extend from an inner surface of said bypass duct or said outer surface of said pulse detonation combustor, or both.

4. The engine of claim 1, further comprising a primary air control valve for controlling a primary air flow into said at least one pulse detonation combustor.

5. The engine of claim 1, wherein at least a portion of an outer surface of said at least one pulse detonation combustor comprises a plurality of turbulators, surface concavities or protrusions, or a combination thereof.

6. The engine of claim 1, wherein fuel control to said at least one pulse detonation combustor is controlled by a fuel control valve.

7. The engine of claim 2, wherein said bypass duct surrounds all of said at least one pulse detonation combustor.

8. The engine of claim 7, wherein said at least one of said converging-diverging portion, said converging portion and said diverging portion is a continuous structure extend around an entire periphery of either said bypass duct or said at least one pulse detonation combustor.

9. The engine of claim 1, further comprising an airflow mixing plenum positioned downstream of the exit portions of both said bypass duct and said pulse detonation combustor.

10. The engine of claim 9, wherein a cross-sectional area of said mixing plenum increases in a downstream direction from said exit portions.

11. An engine comprising:
at least one pulse detonation combustor;
a bypass duct which surrounds at least a portion of said pulse detonation combustor such that an outer surface of said pulse detonation combustor forms an inner surface of said bypass duct and through which a bypass air flow is directed, wherein an exit portion of said bypass duct and an exit portion of said at least one pulse detonation combustor are proximate each other;
a bypass control valve in fluid communication with the bypass duct, the bypass control valve allowing air flow to enter into the bypass duct when the bypass control valve is in an open position, and preventing air flow from entering into the bypass duct when the bypass control valve is in a closed position; and
an airflow mixing plenum positioned downstream of the exit portions of both said bypass duct and said pulse detonation combustor, wherein said mixing plenum contains at least one mixing structure to mix exit flow from said bypass duct with an exit flow from said at least one pulse detonation combustor.

12. The engine of claim 11, further comprising a primary air control valve for controlling a primary air flow into said at least one pulse detonation combustor.

13. An engine comprising:
at least one pulse detonation combustor;
a bypass duct which surrounds at least a portion of said pulse detonation combustor, such that an outer surface of said pulse detonation combustor forms an inner surface of said bypass duct and through which a bypass air flow is directed; and
a bypass control valve in fluid communication with the bypass duct, the bypass control valve allowing air flow to enter into the bypass duct when the bypass control valve is in an open position, and preventing air flow from entering into the bypass duct when the bypass control valve is in a closed position,
wherein an exit portion of said bypass duct and an exit portion of said at least one pulse detonation combustor are adjacent to each other, wherein said engine contains a plurality of pulse detonation combustors, and wherein one of said pulse detonation combustors is positioned within said bypass duct and another of said pulse detonation combustors is positioned within a second bypass duct.

14. The engine of claim 11, further comprising a primary air control valve for controlling a primary air flow into said at least one pulse detonation combustor.

15. An engine comprising:
at least one pulse detonation combustor;
a bypass duct which surrounds at least a portion of said pulse detonation combustor such that an outer surface of said pulse detonation combustor forms an inner surface of said bypass duct and through which a bypass air flow is directed;
a bypass control valve in fluid communication with the bypass duct, the bypass control valve allowing air flow to enter into the bypass duct when the bypass control valve is in an open position, and preventing air flow from entering into the bypass duct when the bypass control valve is in a closed position; and
a mixing plenum,
wherein said mixing plenum is positioned downstream of an exit portion of said bypass duct and an exit portion of said at least one pulse detonation combustor, and wherein a cross-sectional area of said mixing plenum increases in a downstream direction from said exit portions.

16. The engine of claim 15, wherein said bypass duct comprises at least one of a converging-diverging portion, a converging portion, and a diverging portion.

17. The engine of claim 16, wherein said at least one of said converging-diverging portion, said converging portion and said diverging portion extend from an inner surface of said bypass duct or said outer surface of said pulse detonation combustor, or both.

18. The engine of claim 15, wherein air flow to at least one of said bypass duct and said at least one pulse detonation combustor is controlled by a flow control valve.

19. An engine comprising:
at least one pulse detonation combustor;
a bypass duct which surrounds at least a portion of said pulse detonation combustor such that an outer surface of said pulse detonation combustor forms an inner surface of said bypass duct and through which a bypass air flow is directed;
a bypass control valve in fluid communication with the bypass duct, the bypass control valve allowing air flow to enter into the bypass duct when the bypass control valve is in an open position, and preventing air flow from entering into the bypass duct when the bypass control valve is in a closed position; and
a mixing plenum,
wherein said mixing plenum is positioned downstream of an exit portion of said bypass duct and an exit portion of said at least one pulse detonation combustor and, wherein at least a portion of an outer surface of said at least one pulse detonation combustor comprises a plurality of turbulators, surface concavities or protrusions, or a combination thereof.

20. The engine of claim 15, wherein fuel control to said at least one pulse detonation combustor is controlled by a fuel control valve.

21. The engine of claim 15, wherein said bypass duct surrounds all of said at least one pulse detonation combustor.

22. The engine of claim 16, wherein said at least one of said converging-diverging portion, said converging portion and said diverging portion is a continuous structure extending around an entire periphery of either said bypass duct or said at least one pulse detonation combustor.

23. The engine of claim 19, wherein said mixing plenum contains at least one mixing structure to mix exit flow from said bypass duct with an exit flow from said at least one pulse detonation combustor.

24. The engine of claim 16, wherein said at least one of said converging-diverging portion, said converging portion and said diverging portion is positioned adjacent said exit portion of said bypass duct.

25. The engine of claim 15, wherein said engine contains a plurality of pulse detonation combustors.

26. The engine of claim 25, wherein each of said pulse detonation combustors is positioned within said bypass duct.

27. The engine of claim 25, wherein one of said pulse detonation combustors is positioned within said bypass duct and another of said pulse detonation combustors is positioned within a second bypass duct.

* * * * *

UNITED STATES PATENT AND TRADEMARK OFFICE
CERTIFICATE OF CORRECTION

PATENT NO. : 7,841,167 B2  
APPLICATION NO. : 11/561155  
DATED : November 30, 2010  
INVENTOR(S) : Rasheed et al.

Page 1 of 1

It is certified that error appears in the above-identified patent and that said Letters Patent is hereby corrected as shown below:

On the Title Page, item (75), under "Inventors", in Column 1, Line 3, delete "Peirre" and insert -- Pierre --, therefor.

In Column 4, Line 19, delete "dud 20" and insert -- duct 20 --, therefor.

Signed and Sealed this
Twenty-eighth Day of June, 2011

David J. Kappos
*Director of the United States Patent and Trademark Office*